United States Patent

[11] 3,583,170

[72] Inventor Douwe DeVries
 20 Tennyson Place, New Orleans, La. 70114
[21] Appl. No. 794,574
[22] Filed Jan. 28, 1969
[45] Patented June 8, 1971

[54] SUBMERGED PIPELINE ENTRENCHING APPARATUS AND CONTROL SYSTEMS FOR SAME
 21 Claims, 19 Drawing Figs.
[52] U.S. Cl. .................................................... 61/72.4
[51] Int. Cl. ..................................................... B63b 35/04, E02f 5/02
[50] Field of Search ........................................ 61/72.4

[56] References Cited
 UNITED STATES PATENTS
 3,368,358 2/1968 Elliott ........................... 61/72.4
 3,429,132 2/1969 Martin .......................... 61/72.4
 3,434,297 3/1969 Gretter ......................... 61/72.4

Primary Examiner—J. Karl Bell
Attorney—Miller, Raptes & White

ABSTRACT: Pipeline-entrenching systems and apparatus are provided for progressively entrenching submerged pipelines. Pneumatically driven trenching cutters and material exhaust apparatus of the airlift type are coordinated such that the exhaust from the pneumatic cutter drive activates the material exhaust apparatus to remove material from a trench cut effected by the cutters at a rate proportional to the cutter speed. The cutters and exhaust apparatus are mounted on an adjustable platform structure that is operated from an above-surface vessel and includes an adjustable pipeline engaging and follower mechanism which is adaptable to a wide range of pipeline diameters. The cutters and exhaust apparatus are so mounted on the adjustable platform device as to be constrained to effect a trench cut of a conforming depth and size for each specific pipeline diameter encountered to assure uniform trenching depths for the top-line of the pipeline regardless of the pipeline diameter.

INVENTOR
DOUWE DeVRIES

BY
ATTORNEY

INVENTOR
DOUWE DeVRIES

BY *M. Ted Kaptes*

ATTORNEY

INVENTOR
DOUWE DeVRIES

ATTORNEY

SUBMERGED PIPELINE ENTRENCHING APPARATUS AND CONTROL SYSTEMS FOR SAME

This invention relates to submerged trenching machinery and systems for laying pipelines and, more particularly, to such trenching machinery and systems which are self-adapting to a wide range of pipeline diameters and may be used over a wide range of submerged depths.

It is an object of this invention to provide new and novel submerged trenching machinery and systems wherein driven mechanical cutting means effect a breaking up of the normal soil structure and the broken soil is subsequently airlifted out to form a trench cut.

It is another object of this invention to provide a new and novel submerged pipeline trenching machinery and systems in which said machinery travels along a pipeline to be entrenched.

Another object of this invention is to provide new and novel submerged pipeline trenching machinery and systems which are entirely pneumatically powered.

Another object of this invention is to provide new and novel submerged pipeline trenching machinery and systems which are entirely pneumatically powered; and wherein a mechanical cutter is driven by a pneumatic motor to effect a trench cut and the exhaust from the pneumatic motor is utilized to effect an airlift evacuation of material from the said trench cut.

Still another object of this invention is to provide new a novel submerged pipeline trenching machinery and systems wherein said machinery travels along a pipeline to be entrenched and, further, wherein the depth of the trench is automatically effected as a direct function of the diameter of a given pipeline.

Yet another object of this invention is to provide new and novel pipe gripping and following structures for submerged pipeline trenching means.

These and other objects of the present invention will become more fully apparent with reference to the following specification and drawings, which relate to several preferred embodiments of the invention.

Basically, the invention comprises pneumatically driven mechanical cutters mounted on a pipeline follower assembly with a material airlift conduit having a material intake port adjacent each of the cutters to remove the cutter-comminuted material from the trench as it is formed. The pipeline follower assembly is mounted on a marine tractor or sled which straddles a previously laid pipeline to effect a continuous entrenching of the pipeline. The depth of the trench cut as well as the lateral dimensions thereof are automatically conformed to the diameter of the pipeline by the adjustable structure of the pipeline follower in combination with at least a pair of frustoconical cutters and a material airlift conduit adjacent to each of the cutters. The cutters can be sectioned to add or delete to the cutting depth capabilities of each at the extremities of pipeline diameter to be encountered by the trenching means. In all of the embodiments of the invention, the exhaust from the pneumatic motor drives for the cutters is utilized as the input for the material airlift devices. Further, direct-drive, high-torque, pneumatic motors are utilized, precluding the need for transmissions and consequently, minimizing maintenance requirements.

Figure 1:
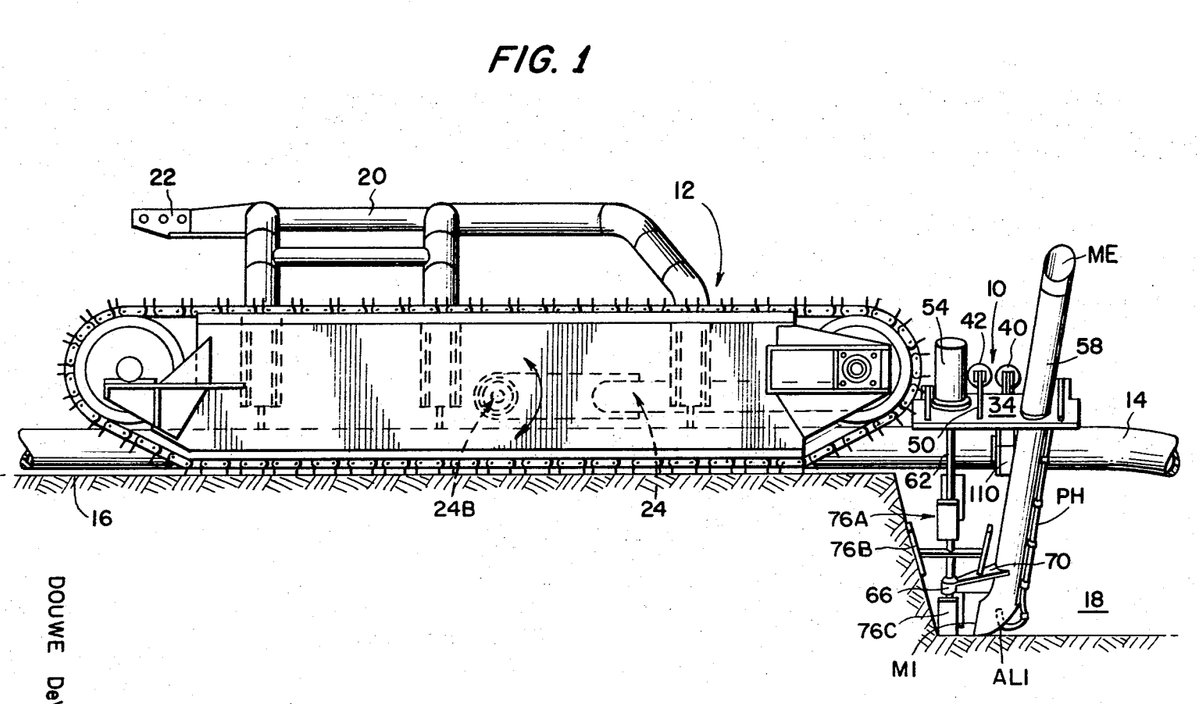
FIG. 1 is a side elevation of a submerged marine tractor and trenching means of the present invention adapted to follow and entrench a previously laid pipeline.

Referring in detail to the drawings, and more particularly to FIG. 1, the trenching means 10 of the present invention is shown mounted on a marine tractor 12, the latter riding astraddle a previously laid pipeline 14 on a submerged surface 16. The trenching means 10 is shown creating a trench cut 18 in the submerged surface 16 for reception of the pipeline 14.

Figure 2:
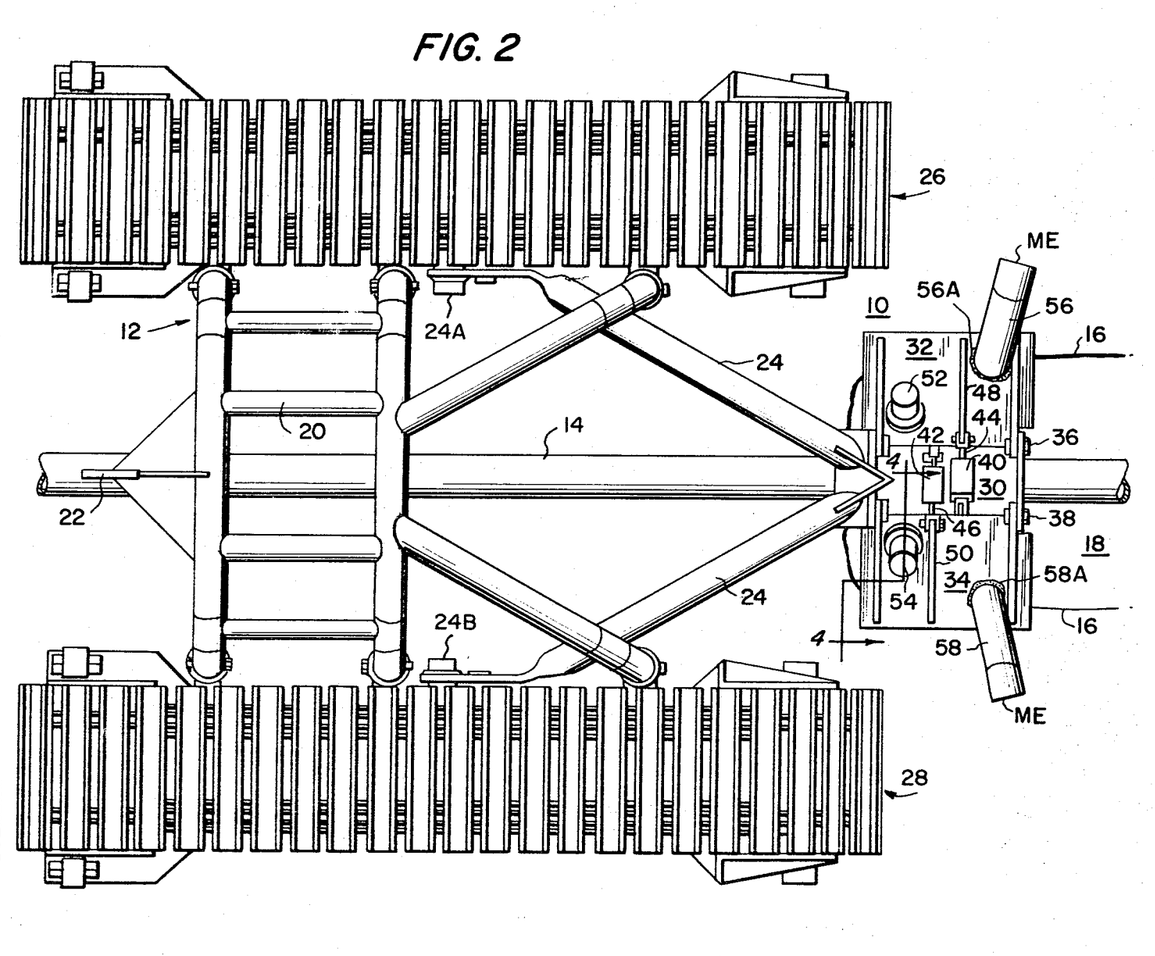
FIG. 2 is a top plan view of FIG. 1.
Figure 3:
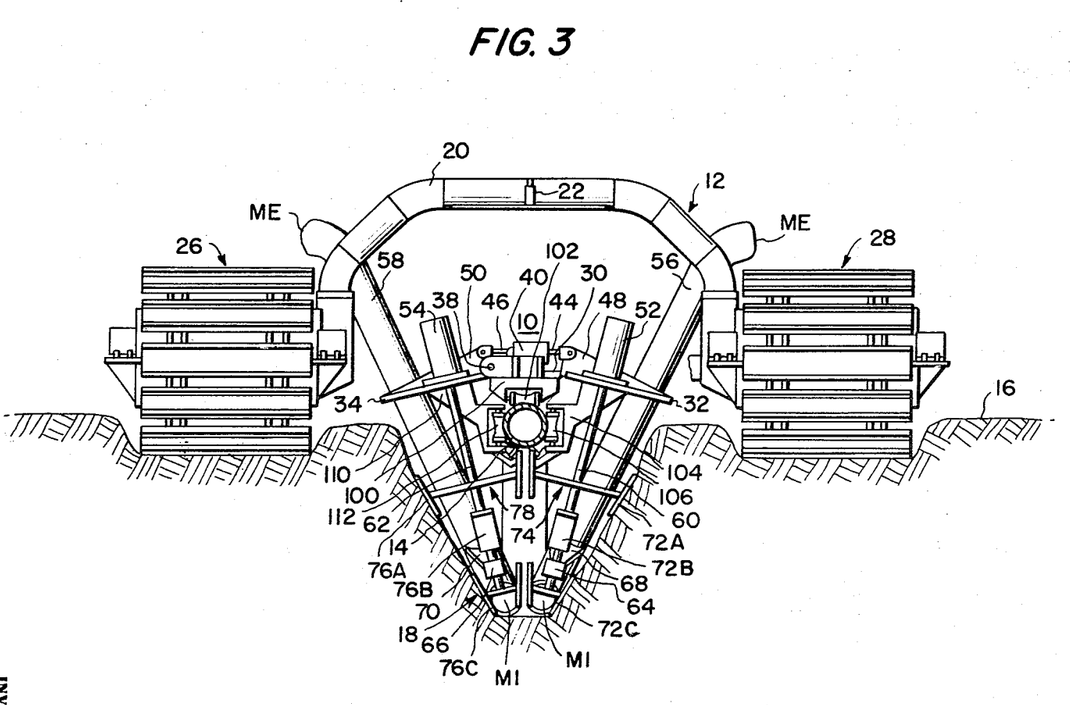
FIG. 3 is a front end view of FIGS. 1 and 2.

Referring additionally to FIGS. 2 and 3, the tractor 12 is shown as having a central section comprising an open framework 20 having a forwardly extending draft bar 22 and a rearwardly extending mounting boom assembly 24 for retaining the trenching means 10 on the tractor 12 by means of vertical pivots 24A and 24B at the inboard ends of each arm of the mounting boom assembly 24. This provides for free vertical movement of the trenching means 10.

Caterpillar tread hull sections 26 and 28 are provided on opposite sides of the center frame assembly 20. Each of the hull sections 26 and 28 can contain ballast tank sections as well as self-propulsion devices as generally known in the art to effect proper attitude and propulsion effects depending upon the depth of operation.

As shown in FIGS. 1, 2 and 3, the trenching means 10 is basically comprised of a main mounting plate 30 having first and second wing plates 32 and 34 mounted on opposite sides thereof (opposite sides of the pipeline 14) by means of hinges 36 and 38, respectively.

The respective attitudes of the wing plates 32 and 34 are controlled by pneumatic actuator cylinders 40 and 42, respectively, mounted on the main plate 30 and having respective displaceable piston rods 44 and 46 extending to vertical radius arms 48 and 50 on the respective wing plates 32 and 34.

The vertical radius arms 48 and 50 are in the form of upstanding welded bosses on the wing plates 32 and 34, respectively, and are disposed transversely of the pipeline 14.

The wing plates 32 and 34 mount pneumatic motors 52 and 54, respectively, and material airlift conduits 56 and 58 respectively, for a purpose to be hereinafter more fully described.

Referring jointly to FIGS. 1, 2, 3 and 4, the cutter motors 52 and 54 have respectively dependent output shafts 60 and 62 extending therefrom and have the respective lower extremities thereof journaled in bearing means 64 and 66.

The bearing means 64 and 66 are respectively fixed on brackets 58 and 70 extending from welded to the lower extremities of the airlift conduits 56 and 58.

The first output shaft 60, as best shown in FIG. 3, mounts first, second and third sets of cutter blades 72A, 72B and 72C, the lowest set extending beyond the lowermost point on the first output shaft 60. Each cutter assembly or set, when rotated, defines a frustum of a common conic surface which, if extrapolated, would have its apex beneath the lowermost portion of the trench cut 18. The uppermost set of cutters 72A is removably mounted on the output shaft 60 for a purpose to be hereinafter more fully described. Radial cutter blade-mounting arms 74 are removably mounted on the output shaft 60 in any suitable manner to effectuate removal of the cutter set 72A.

Figure 4:
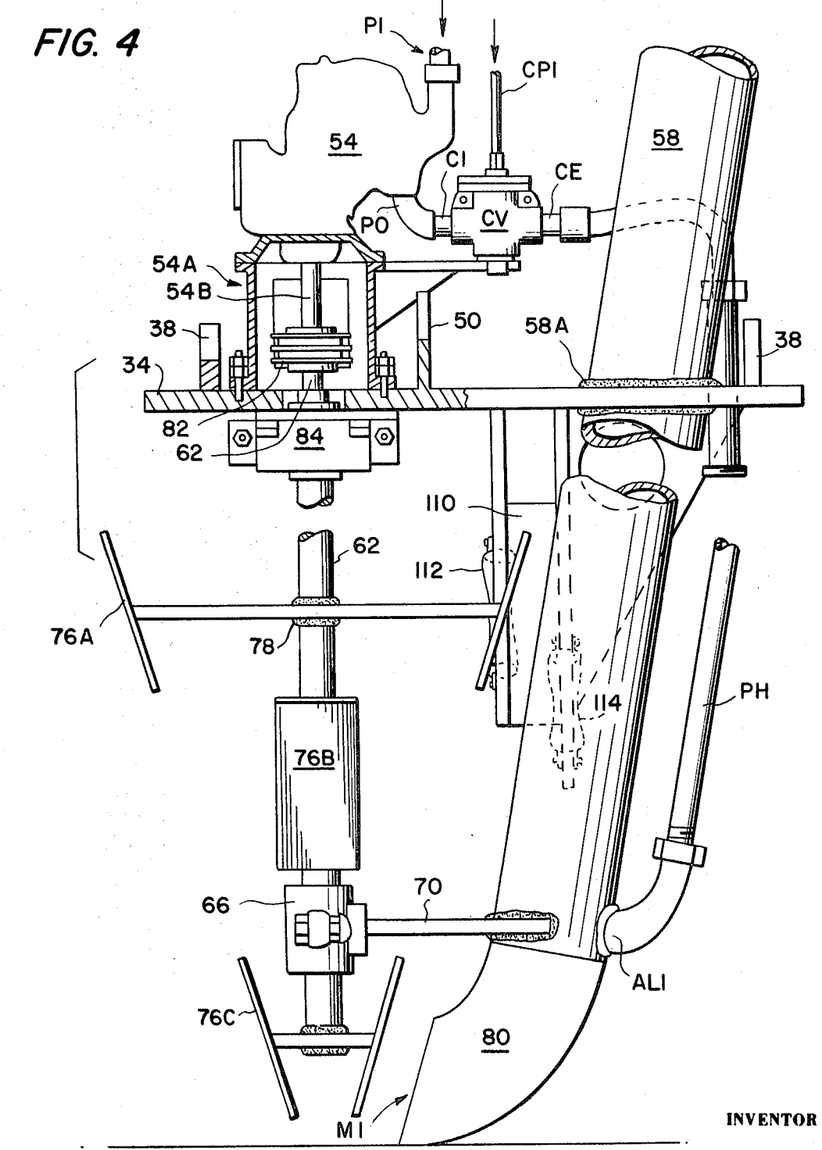
FIG. 4 is a cross section taken along line 4—4 of FIG. 1.

The second output shaft 62, as best shown in FIGS. 3 and 4, mounts first, second and third sets of cutter blades 76A, 76B and 76C is substantially vertical registry with the three sets of cutter blades 72A, 72B and 72C, respectively, with the lowermost cutter set 76C extending beyond the lowermost point on the second output shaft 62.

Each of the sets of cutters 76A—76C, when rotated, define a frustum of a common conic surface which, if extrapolated, would have its apex beneath the lowermost portion of the trench cut 18. The uppermost set of cutters 76A is removably mounted on the output shaft 62 for a purpose to be hereinafter more fully described. Radial cutter blade mounting arms 78 are removably mounted on the output shaft 62 in any suitable manner to effectuate removal of the cutter set 76A. System In both pluralities of cutter sets 72A—72C and 76A—76C, the uppermost and lowermost sets have the same relative angular orientation about the output shafts 60 and Airlift with the intermediate cutter sets 72B and 76B rotated 90° relative thereto.

Pneumatic Cutter Drive and Airlift System

With particular reference to the detailed showing of FIG. 4, the pneumatic drive for the second output shaft 62 and the sets of cutters 76A, 76B and 76C thereon, will now be described as typical for both output shafts 60 and 62.

The pneumatic drive motor 54 is shown as having a pressure input port PI and a pressure exhaust port PO, the latter being connected to the inlet port CI of a motor control valve CV, the latter including an exhaust port CE and a control pressure input CPI for opening and closing a pressure path between the inlet port CI and the exhaust port CE.

The exhaust port CE of the motor control valve is connected through a pressure hose PH to an airlift inlet port ALI in the wall of the airlift conduit 58 adjacent to but slightly above the lowermost portion of the said conduit 58.

The material intake MI of the airlift conduit 58 comprises the open end of an elbow fitting 80 on the lower end of the conduit 58 which intake MI faces the rear side of the lowermost cutter set 76C, i.e., the trailing side thereof, since the forward trenching motion of the cutter set 76C is to the left as it is shown in FIG. 4.

The cutter motor 54 is shown as including a sealed main shaft coupling section 54A mounted on the upper surface of the second wing plate 34.

The coupling section 54A houses a motor output shaft 54B, a rotary shaft coupling 82 and the upper end of the second output shaft 62, the latter being coupled to the motor output shaft 54B through the rotary coupling 82. The second output shaft 62 is journaled through the second wing plate 34 by a bushing assembly 84.

The tubular airlift conduit 58 is passed through the second wing plate 34 and welded in place therein as shown at 58A. This weld is also shown in FIG. 2 as is a similar weld 56A for the tubular airlift conduit 56 in the first wing plate 32.

As clearly shown by reference to FIGS. 2 and 3, the airlift conduits 56 and 58 have respective material exhausts ME which are directed 58 of the trench cut 18 and the respective material intakes MI thereof are positioned immediately adjacent the bottom of the trench cut 18.

For the balance of this description all pressure connections, intakes and exhausts for the cutter motors 52 and 54 and for the tubular airlift conduits 56 and 58 shall bear identical designations and are to be considered in the identical relationships defined with respect to the cutter motor 54 and airlift conduit 58 in FIG. 4.

Each of the cutter motors 52 and 54 will henceforth bear two pressure input designations; PIF for the forward pressure input and PIR for reverse pressure input. Both of these cutter motors are of the reversible type. The exhausts PO are common to both forward and reverse pressure actuation modes.

The wing plate actuating cylinders 40 and 42 each have two pressure inputs PU for the "up" or raising modes of the wing plates 32 and 34 and PD for the "down" or lowering modes of the said wing plates.

Figure 5:
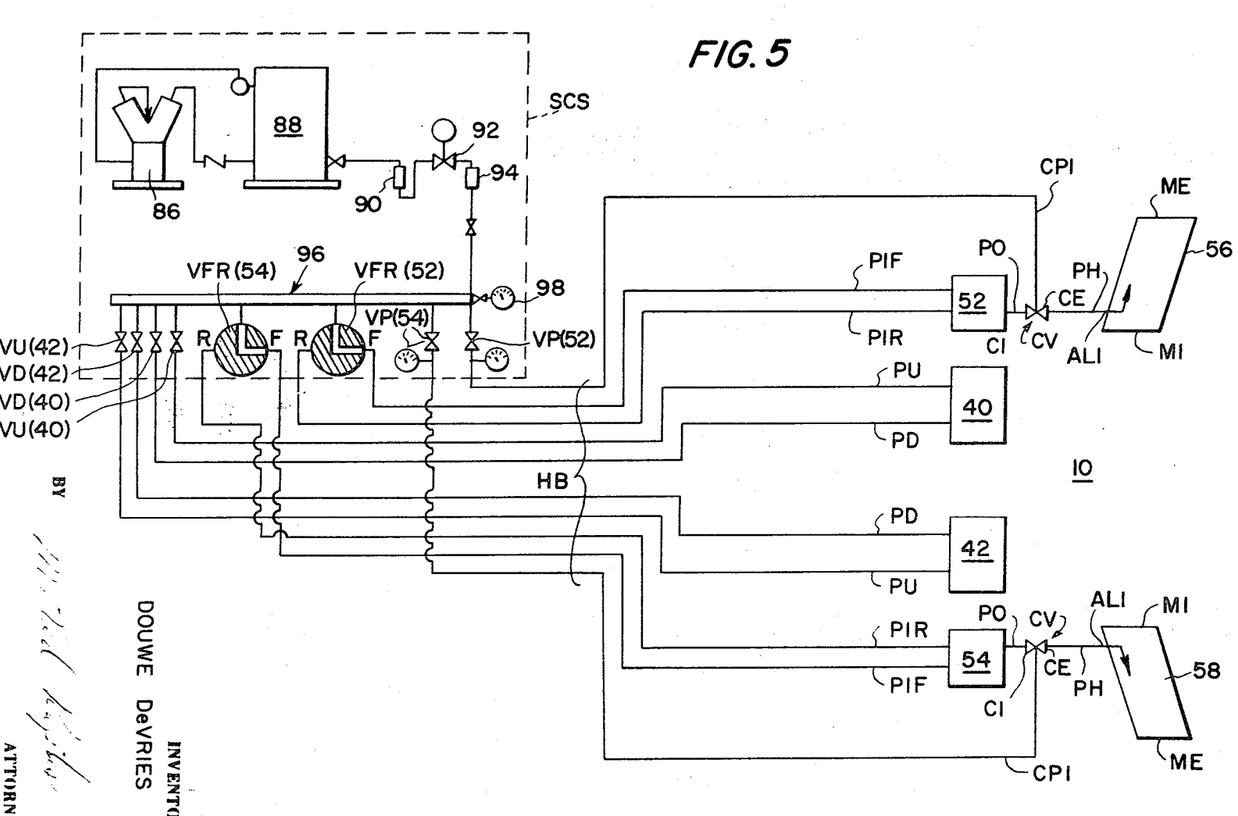
FIG. 5 is a schematic diagram of a pneumatic control system for the trenching means of FIGS. 1—4.

These pressure connections are all shown in the schematic pressure system of FIG. 5. Referring to FIG. 5, the trencher and pressure system of the present invention is shown as comprising a surface control station SCS, the submerged trencher assembly 10 and a multiple pressure hose bundle HB extending from the surface control station SCS to the respective pneumatically actuated components of the submerged trencher assembly 10.

The surface control station SCS includes an air compressor 86 feeding a supply pressure tank 88, an output filter 90 from the supply tank 88 which conducts main supply pressure through a regulator valve 92 and thence through an air lubricator means 94 to a common air supply header 96, the latter being monitored by a gauge 98.

A plurality of surface control valves are connected between the header 96 and the individual pressure hoses of the hose bundle HB. These valves will be designated VU for "up" control, VD for "down" control, VFR for "forward" and "reverse" selective control, and VP for those valves supplying the control inputs to the motor control valves CV at the cutter motors 52 and 54. All of the foregoing will be suffixed, parenthetically with the respective appropriate numerals of the trench actuating devices with which they are associated.

Proceeding from left to right on the header 96, as it is shown in FIG. 5, the following surface control valves are shown:

VU (42) connected to the "up" input PU of the actuating cylinder 42;

VD (42) connected to the "down" input of the actuating cylinder 42;

VD (40) connected to the "down" input of the actuating cylinder 40;

VU (40) connected to the "up" input of the actuating cylinder 40;

VFR (54) connected by its forward and reverse outputs F and R to the forward and reverse inputs PIF and PIR, respectively, of the cutter motor 54;

VFR (52) connected by its forward and reverse inputs PIF and PIR, respectively, of the cutter motor 52;

VP (54) connected to the control pressure input CPI of the control valve CV of the cutter motor 54; and VP (52) connected to the control pressure input CPI of the control valve CV of the cutter motor 52.

Adjustable Pipeline Gripping and Follower Structure

The main baseplate 30 and the two wing plates 32 and 34 of the trenching assembly 10 each carry dependent roller assemblies adapted to individually engage the outer periphery of a pipeline 14 and in combination, grip the pipeline 14 while the tractor 12 or other vehicle carrying the said assembly 10 traverses the length of the pipeline 14.

Figure 6:
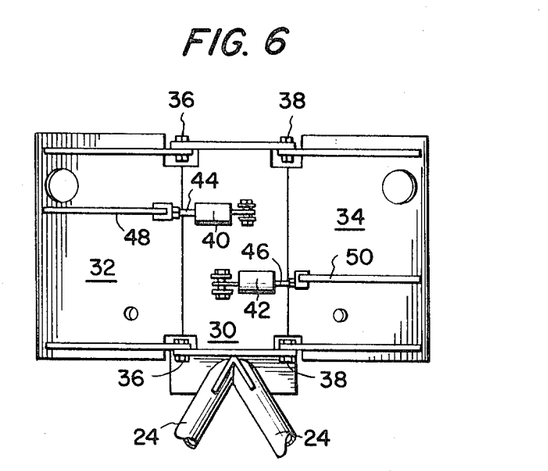
FIG. 6 is a top plan detail of an adjustable pipe follower assembly which is self-adapting to a range of pipeline diameters to control the trenching depth effected by the trenching means of FIGS. 1—5.
Figure 7:
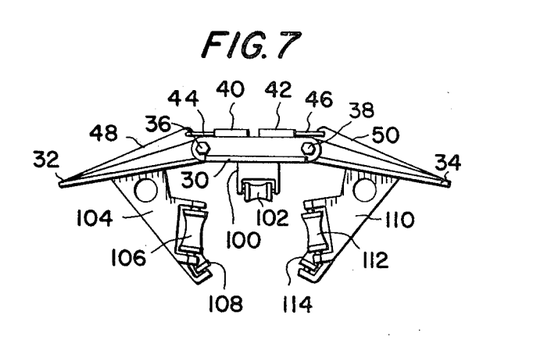
FIG. 7 is a front end view of FIG. 6 illustrating pipeline engaging roller means effecting a multiple-point engagement with a pipeline to be entrenched.
Figure 8:
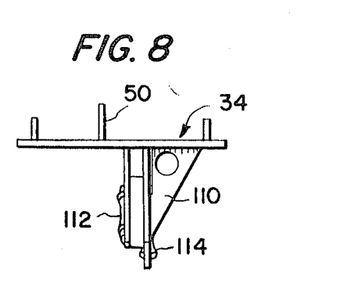
FIG. 8 is a side elevation of an adjustable wing plate and roller assembly of FIGS. 6 and 7.
Figure 9:
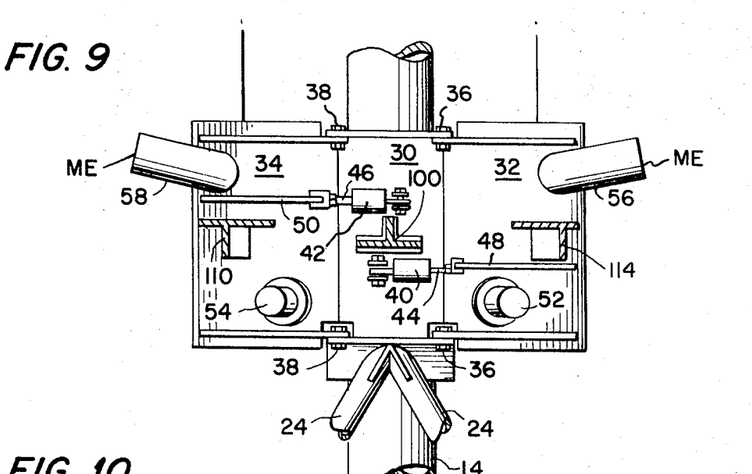
FIG. 9 is a top plan view of an adjustable pipe follower and trenching assembly on a pipeline.

Referring jointly to FIGS. 6, 7 and 8, the main plate 30 and wing plates 32 and 34 are shown in combination with the wing plate actuating cylinders 40 and 42.

Beneath the main plate 30 is an integral dependent bracket 100 which maintains a contoured first roller 102 having its axis of rotation transversely disposed of the main plate 30 and therefore, transversely disposed of the longitudinal axis of any pipeline being entrenched by the present invention.

Beneath the first wing plate 32 is an integral dependent angle bracket 104 bearing first and second offset rollers 106 and 108 at the inboard portion thereof, such that the said rollers are adapted to engage the periphery of a pipeline being entrenched both above and below its longitudinal axis.

Beneath the second wing plate 34 is another integral dependent angle bracket 110 bearing first and second offset rollers 112 and 114 at the inboard portion thereof, such that the said rollers are adapted to engage the periphery of a pipeline being entrenched both above and below its longitudinal axis.

All of the said rollers 102, 106—108 and 112—114 are engageable with a pipeline in substantially the same diametric plane therethrough.

The Operative Relationship Between Pipeline Diameter and Trench Cut Depth

Referring to FIGS. 9, 10, 11 and 12, it is now readily seen that any pipeline being entrenched passes beneath the main plate 30 with its longitudinal axis transverse to that of the dependent or top roller 102 on the main plate 30.

The top roller 102 is the index position for pipelines 14 of all diameters within the adjustable range of the invention. For example, the present invention is contemplated as adaptable to a pipeline diameter range of from 10 to 40 inches.

Once the top roller 102 is in position, i.e., juxtaposed with the uppermost periphery of a pipeline 14, the actuating cylinders 40 and 42 initially holding the wing plates 32 and 34 in their "up" positions, the said actuating cylinders 40 and 42 are actuated via the surface control valves VD (40) and VD (42) of FIG. 5 to lower the wing plates 32 and 34 and cause the dependent rollers 106 and 110 to swing downwardly and inwardly into juxtaposition with the periphery of the pipeline 14 below the centerline of the latter. It should be noted that only single side rollers are shown in this embodiment, although the roller pairs 106—108 and 112—114 can be used in FIGS. 9, 10, 11 and 12.

It should now be noted that in actual use for a range of pipe diameters, the vertical bracket 100 holding the roller 102 is a T-beam which is vertically adjustable in the main plate 30 such that the proper index position for a given pipeline diameter can be preset.

This is also effected in the angle brackets 104 and 110 which maintain the rollers 106 and 112 beneath the wing plates 32 and 34, respectively. These brackets comprise vertically adjustable T-beams mounted, respectively, in the wing plates 32 and 34.

Once the brackets 100, 104 and 110 are set for a given pipeline diameter and the main plate 30 is positioned over the pipeline with the top roller 102 juxtaposed therewith, the actuating cylinders 40 and 42 are actuated to respectively constrain the wing plates 32 and 34 downward until the rollers 106 and 110 engage the periphery of the pipeline 14.

The swings the cutter outputs shafts 60 and 62 and the airlift conduits 56 and 58 into the proper orientation to effect a trench cut 18 of a compatible size for the diameter of the pipeline 14.

Also, the pipeline 14 is now gripped by the rollers 102, 106 and 112 such that it is suspended adjacent the normal bottom surface 16 and directly above the trench cut 18 as it is effected. This precludes undue stressing of the pipeline 14 by bending and flexing.

Figure 11:
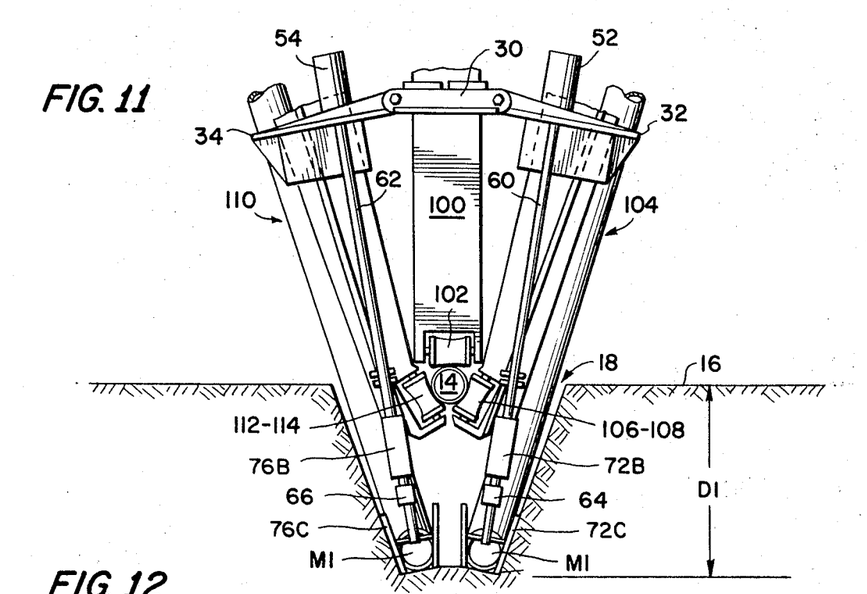
FIG. 11 is a front end view of FIG. 9 adapted to a pipeline of lesser diameter than that of FIGS. 9 and 10.

Note, for example, that in FIG. 11, the smallest diameter shown for the pipeline 14, produces the smallest trench depth D1.

Figure 10:
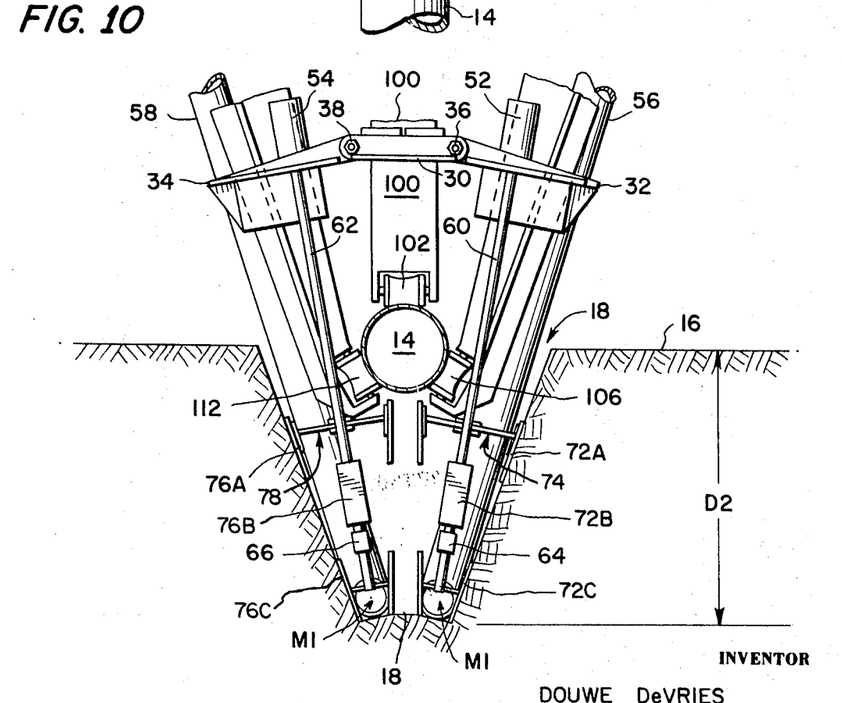
FIG. 10 is a front end view of FIG. 5.

An increased pipeline diameter such as shown in FIG. 10, produces an increased trench depth D2.

Figure 12:
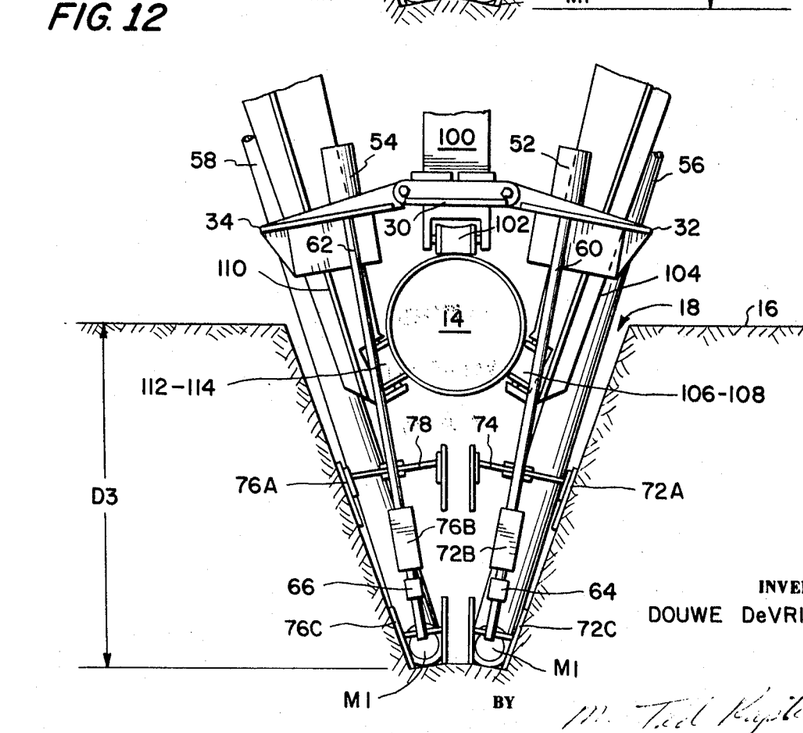
FIG. 12 is a front end view of FIG. 9 adapted to a pipeline of greater diameter than FIGS. 9 and 10.

Accordingly, the largest diameter of pipeline 14, as shown in FIG. 12, produces the largest trench depth D3.

By this relationship, the top line of the pipeline 14 is always buried substantially the same distance below the submerged surface 16 in the trench cut 18.

Because the lengths of the cutter (output) shafts 60 and 62 are fixed, as are the lengths of the airlift conduits 56 and 58, the width and depth of a given trench cut 18 are automatically effected by the attitude of the wing plates 32 and 34 when the rollers 102, 106—108 and 112—114 are in juxtaposed relationship with a pipeline 14 of given diameter.

It should be noted that at the lowermost range of pipeline diameters, such as illustrated in FIG. 11, the upper cutter assemblies 72A and 76A have been removed from the output shafts 60 and 62, respectively, to provide proper clearance for the pipeline 14 and permit a shallow trench cut 18 to be effected.

Adjustable Skid Frame Structure For Adjustable Trench Cutter Assembly

In some undersea applications it is preferable to utilize a twin-hull skid frame astraddle the pipeline 14 for maintaining the position of the trench cutter assembly 10 properly referenced to the said pipeline.

This is particularly desirable where the bottom surface is relatively uneven and some form of self-compensation for terrain variations is desirable in the trench cutter vehicle.

Such a skid frame will now be described with reference to FIGS. 13 and 14 wherein the skid frame, generally designated by the numeral 116, includes a fixed box frame portion 118 and two folding outboard frames 120 and 122 extending from the box frame to support first and second compartmented hull or pontoon sections 124 and 126, respectively.

The outboard frames 120 and 122 comprise pivoted parallelogram linkages in the vertical plane and fixed rectangular structures with fixed diagonal braces 128 and 130, respectively, in the top plane thereof.

The parallelogram linkages at each end of each of the frames 120 and 122 each contain a variable length diagonal brace comprising air cylinders 120A, 120B and 122A, 122B, respectively. These air cylinders have extensible piston rods 132A, 132B, 134A and 134B, respectively, which, when fully extended, effect the dotted line configuration of the skid frame 116 shown in FIG. 13.

The outboard frames 120 and 122 extend over and above the trench cutter wing plates 32 and 34, respectively, such that a change in the configuration of the skid frame 116, consistent with the diameter of a pipeline 14 does not interfere with the adjustment in attitude of the wing plates 32 and 34 or the dependent cutters 72A, 72B, 74A, 74B and airlift tubes 56 and 58 thereon.

The two hulls 124 and 126 are compartmented and adapted to be pressurized from the top with compressed air and in open communication with the undersea pressure at the lower ends thereof. Thus, variable buoyancy is readily established and conformation thereof to operating depth can be readily effected.

The air cylinders 120A, 120B, 122A and 122B, because of the compressibility of the air therein, permit self-compensation of the orientation of the skid frame 116 to variations in the bottom surface 16 on either side of the trench cut 18. Thus, over a reasonable range of variation, one of the hulls 120 and 122 may vertically displace without affecting the orientation or attitude of the box frame 118 of the main plate 30 of the trenching apparatus.

Figure 13:
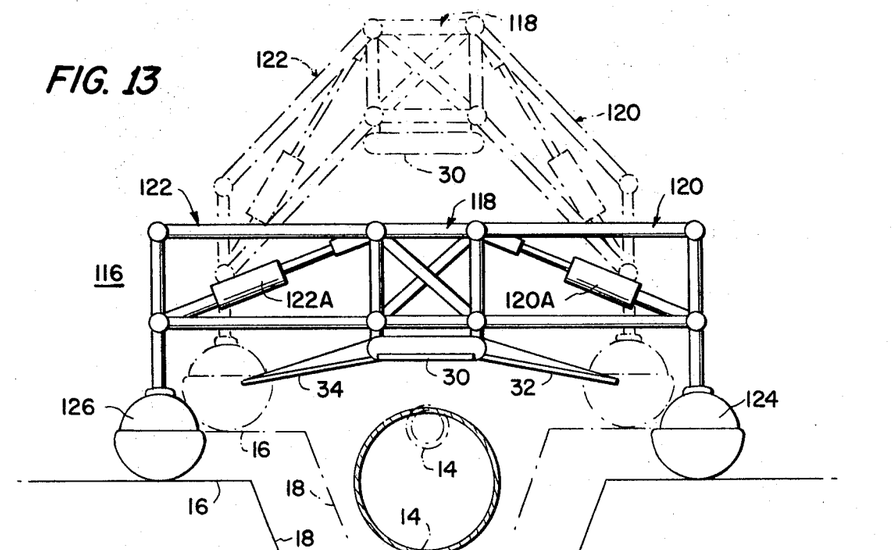
FIG. 13 is a f front elevation of a second embodiment of the invention in which an adjustable sled structure is provided for the trenching means of the present invention.

The skid frame 116 is primarily intended for use with the adjustable trenching assembly described in connection with FIGS. 9, 10, 11 and 12 and provides, as shown in FIG. 13, the range of positions needed to effect, for example, the entrenching of pipelines 14 over a pipeline diameter range of from 10 to 40 inches.

Environmental Versatility

Referring now to FIGS. 15 through 19, the operating versatility of the present invention in various environments will be described. The primary environmental changes involved relate to water depth and propulsion modes.

Figure 15:
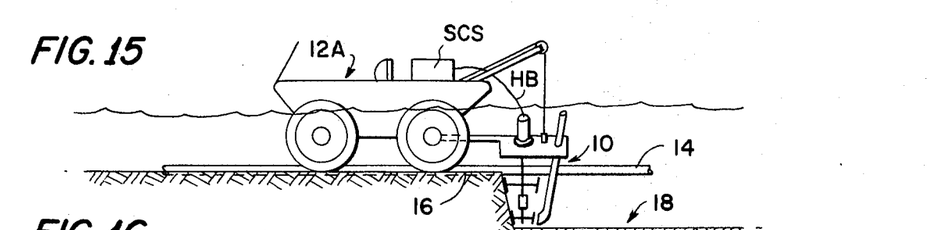
FIG. 15 is a schematic illustration of the trenching means of the present invention mounted on a marsh buggy in relatively shallow-water applications.

For example, referring to FIG. 15, the undersea tractor 12 previously described in FIGS. 1—3, may be replaced by a marsh buggy 12 A for shallow water applications as the carrying vehicle for the trench cutter assembly 10.

Figure 16:
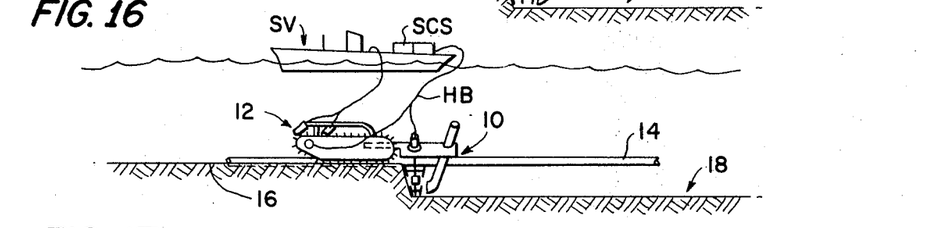
FIGS. 16 and 17 are schematic illustrations of both self-propelled and draft versions, respectively, of the embodiment of FIGS. 1—4 in relatively deep-water applications.

In FIG. 16, for example, a regular surface vessel SV is shown with a split hose bundle HB leading to a submerged tractor 12 which is self-propelled pneumatically by air supplied through the split hose bundle HB. The trench cutter assembly 10 is carried aft of the tractor 12 as described in FIGS. 1, 2 and 3.

Figure 17:
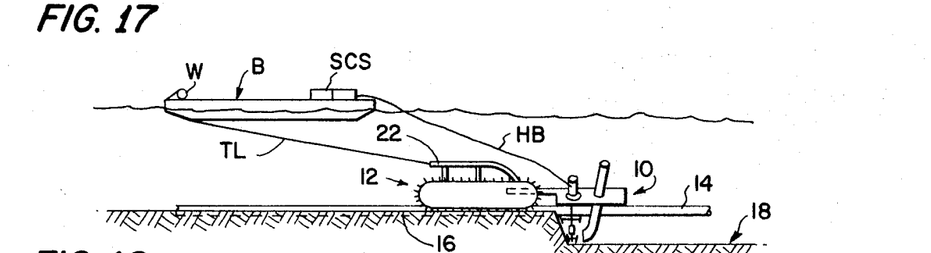

In FIG. 17 the tractor 12, of the general configuration of FIG. 16, is shown as a drawn conveyance with a tow line TL extending from the draft bar 22 thereof to a winch W or the like on a surface barge B.

Figure 14:
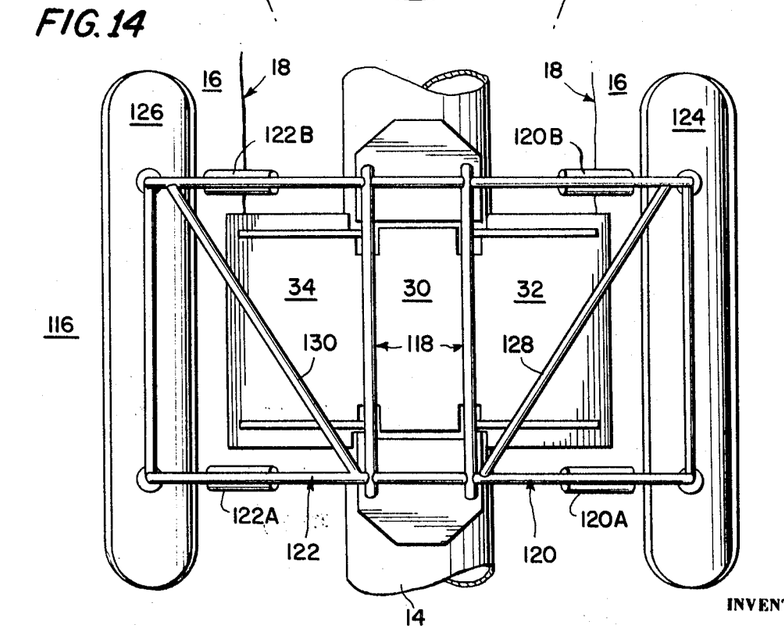
FIG. 14 is a top plan view of the sled structure of FIG. 13.
Figure 18:
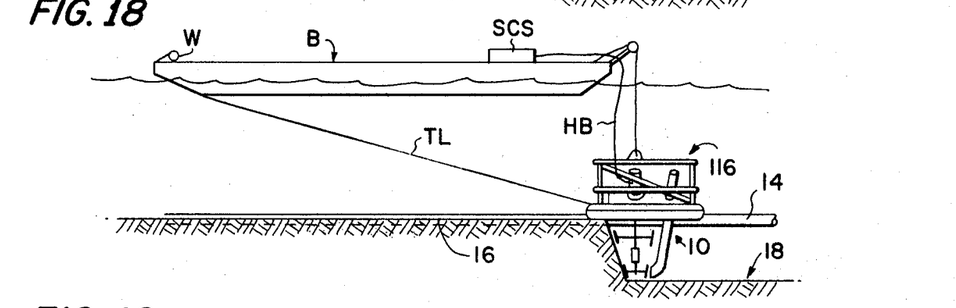
FIGS. 18 and 19 are schematic illustrations of both draft and self-propelled versions, respectively, of the embodiment of FIGS. 16 and 17 in relatively deep-water applications.

FIG. 18 shows a barge B and tow line TL configuration for the skid frame 116, described in FIGS. 13 and 14, the frame 116 now being a part of the trench cutter assembly 10. The skid frame is necessary in this application since there is no vehicle to stabilize the cutter assembly.

Figure 19:
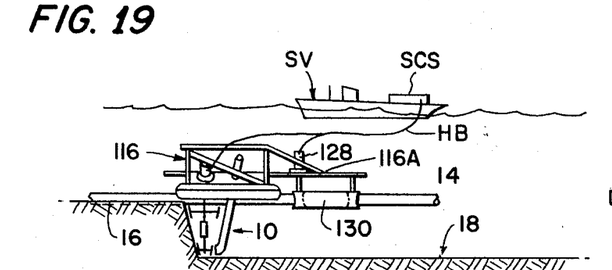

Reference is now made to FIG. 19 which shows a self-propulsion made for the skid frame 116 and trench cutter assembly 10 which is adapted to be followed by a surface vessel SV.

The frame 116 includes an extension frame 116A on which is mounted pneumatic motors 128, the latter being driven via compressed air from a split hose bundle HB extending to a surface vessel SV. The pneumatic motors 128 drive traction belts 130 which grip the pipeline 14 and effect traction thereon to propel the skid frame 116 and trench cutter assembly 10 along the pipeline 14 with a pushing action.

In each of the foregoing FIGS. 15—19, the hose bundle HB extends from the trench cutter assembly 10 and other power devices below the surface to a surface control station SCS in the marsh buggy 12A, surface vessel SV or barge B as the case may be.

Operation

Since the adjustment features of the trench cutter assemblies 10 and the skid frame 116 have already been described as to operation, this description of operation will be confined to FIGS. 1, 2, 3, 4 and 5 to show the surface coordination effected through the hose bundle HB to the trench cutter assemblies 10 from the surface control station SCS.

For the purpose of this description it will be assumed that the tractor 12 is submerged and that the hulls 26 and 28 are positioned on opposite sides of the pipeline 14 with the roller brackets 100, 102, and 110 on the plates 30, 32 and 34 set for the diameter of the pipeline 4.

It will also be assumed that the pipeline has been engaged by the index roller 102; has not yet been engaged by the rollers 106 and 112, i.e., the valves VU(40) and VU(42) are open and the valves VD(40) and VD(42) are closed (i.e., vented) so that the wing plates 32 and 34 are in their uppermost positions; the motor supply valves VFR(52) and VFR(54) are in the forward positions F; and the pilot pressure control valves VP(52) and VP(54) are vented, precluding operation of the cutter motors 52 and 54 by closing the motor control valves CV at the trench-cutting assembly 10.

Now, at the surface control station SCS, the control valves VD(40) and VD(42) are opened and the valves VU(40) and VU(42) are vented, causing the actuating cylinders 40 and 42 to lower the wing plates 32 and 34, respectively, until the rollers 106 and 112 (or roller pairs 106—108 and 112—114) engage the pipeline 14.

This causes the cutter sets 72A—72B—72C and 76A—76B—76C and the airlift conduits 56 and 58 to enter an existing partial trench or embed themselves in the bottom 16 beneath the pipeline 14.

The pilot pressure control valves VP(52) and VP(54) are then opened to pressurize the control pressure inlets CPI of the motor control valves CV through the house bundle HB and cause the said motor control valves CV to open.

Two things now occur. First, the cutter motors 52 and 54 are caused to rotate in their forward directions since operating pressure at the inputs PIF thereof can now flow through the said motors and exhaust through the paths PO, CI, CE and PH into the airlift lift conduits 56 and 58. Thus, the airlift mechanisms have been activated. Second, and simultaneously, the output shafts 60 and 62 and the attached cutter sets 72A—72B—72C and 76A—76B—76C begin to rotate and comminute material to form the trench cut 18.

Once all of these actions commence, the comminuted subsurface material at the cutter sets 72A—72B—72C and 76A—76B—76C is integrated into the material intakes MI of the airlift conduits 56 and 58 and ejected rearwardly and laterally of the trench cut 18 through the material exhaust ports ME of the said airlift conduits.

The high pressure air entering the lower portions of the airlift conduits 56 and 58 through the pressure hoses PH causes an upward flow of water and material from the trench cut 18 of substantial velocity and volume, thereby evacuating the trench cut 18 to receive the pipeline 14 at the proper depth beneath the submerged surface 16.

If the trench cut is to be started, the cutter motors 52 and 54 can be started prior to the pipeline-gripping sequence described above to permit penetration to a depth at which the top roller 102, beneath the main plate 30 engages the upper periphery of the pipeline 14. Then, the control valves VD(40), VU(40), VD(42) and VU(42) can be sequenced with the cutter motors 52 and 54 running, to effect a full engagement of the remaining rollers 106 and 112 with the pipeline 14.

The speed of the cutter motors 52 and 54 is controlled by varying the settings of the motor control valves CV. This is effected by modulating the pressure at the control pressure inlets CPI of the control valves CV by selective setting of the pilot pressure control valves VP(52) and VP(54) at the surface control station.

Thus, the exhaust flow rate through the valves CV controls the speed of the cutter motors 52 and 54 as well as fully coordinating the flow of air through the airlift conduits 56 and 58 with the speed of the cutter sets 72A—72B—72C and 76A—76B—76C.

As can now be readily seen from the foregoing description and drawings, the present invention provides new and novel submerged trenching apparatus and systems for entrenching submerged pipelines and the like.

The present invention is extremely versatile as to operating depth and is readily adaptable to a wide range of pipeline diameters, automatically coordinating the latter with the appropriate size trench cut to receive the pipeline.

Further, the present invention provides full coordination between trenching speed and material removal from the trench cut as well as automatic compensation for changes in the submerged terrain over which it travels.

I claim:

1. Submerged trenching means for entrenching pipelines and the like initially resting on a submerged surface comprising a surface control station having a source of compressed air and a plurality of control means;
an ambulatory vehicle comprising at least two hulls adapted to rest on a submerged surface, one on each side of a pipeline resting on said submerged surface;
trenching apparatus carried by said vehicle over said pipeline, said apparatus comprising pipeline engaging and following means, cutter means adapted to effect a trench cut beneath said pipeline, power operated vertically adjusting means operatively connected to said pipeline engaging and cutter means for adjusting said engaging and cutter means in relation to the diameter of the pipeline, material removal means associated with said cutter means to evacuate material from said trench cut adjacent said cutter means, and power means for each of said engaging and following means, said cutter means and said material removal means;
pneumatic conduit means selectively interconnecting said plurality of control means with said power means;
said engaging and following means being adjustable to receive a variety of pipeline diameters; and said cutter means and said material removal means being coordinated with said engaging and following means such that a trench cut is effected, beneath said pipeline, of a depth and width particularly adapted to the diametric size of said pipeline to effect a substantially uniform trenching depth of the top-line of said pipeline regardless of its diameter.

2. The invention defined in claim 1, wherein said trenching means further includes a surface vessel; and
 means interconnected with said surface vessel and said ambulatory vehicle to effect translation of said vehicle and said trenching apparatus along said pipeline.

3. The invention defined in claim 1, wherein said ambulatory vehicle includes self-propulsion motor means of the pneumatic type; and
 wherein said motor means is connected with said compressed air supply through said control means and said pneumatic conduit means.

4. The invention defined in claim 1, wherein said ambulatory vehicle includes self-propulsion motor means of the pneumatic type;
 wherein said motor means is connected with said compressed air supply through said control means and said pneumatic conduit means;
 said motor means comprising first and second pneumatic motors mounted one on each of said hulls; and
 traction means on each of said hulls in driven connection with respective ones of said pneumatic motors.

5. The invention defined in claim 1, wherein said ambulatory vehicle includes self-propulsion motor means of the pneumatic type;
 and traction means extending from said vehicle into engagement with said pipeline;
 said traction means being in driven connection with said motor means to effect translation of said vehicle along said pipeline.

6. Trenching apparatus for submerged pipelines, comprising:
 an ambulatory submerged vehicle having first and second hull sections and a raised frame means maintaining said hulls in substantially parallel alignment, said hulls being adapted to maintain said frame means astraddle a submerged pipeline for translation along said pipeline when the latter is resting on a submerged surface;
 a fixed platform extending rearwardly from said frame means directly over said pipeline and substantially parallel with said hull sections;
 said fixed platform comprising an elongated plate having first and second opposed power-actuating cylinders, each having an extensible piston rod, transversely mounted thereon;
 first and second elongated wing plates pivotally mounted on opposite sides of said fixed platform and including fixed vertical arms connected with the free ends of the respective piston rods of said actuating cylinders, whereby said actuating cylinders effect selective angular orientation of said wing plates with respect to said fixed platform;
 first and second rotary pneumatic motor means, each having a pressure input and a pressure output, mounted, respectively, on said first and second wing plates;
 first and second dependent, elongated, rotary, output shafts extending, respectively, from said first and second motor means, said output shafts being substantially perpendicular to the plane of said wing plates;
 cutter means mounted on each of said output shafts below said wing plates;
 first and second material conduit means fixed, respectively, in said first and second wing plates adjacent said first and second output shafts, respectively, each said conduit means having a material intake adjacent the lowermost portion of its associated output shaft and cutter means and a material exhaust above and outboard of its respective wing plate;
 a source of pneumatic pressure connected to the pressure input of each of said motor means;
 variable flow valve means at the pressure output of each said motor means;
 pressure conduit means extending from each of said variable flow valve means into a respective one of said material conduit means immediately above said material intake thereof;
 pipeline engaging and following means suspended below said fixed platform and each of said wing plates;
 said engaging and following means suspended below said wing plates being so oriented with respect to said cutter means and said material conduit means as to control the orientation of the latter two means to effect a trench cut of a shape and size tailored to the size of a pipeline when said engaging and following means are juxtaposed with said pipeline.

7. The invention defined in claim 6, wherein said variable flow valve means selectively control the rates of rotation of said motor means and said cutter means by controlling the exhaust rate from said motor means and simultaneously effects a flow of compressed air through said pressure conduit means into said material conduit means at a flow rate proportional to the speed of said cutter means, thereby effecting material removal from said trench cut at a rate consistent with the speed of said cutter means.

8. The invention defined in claim 7, wherein each said cutter means, during rotation, describes a frustoconical surface.

9. The invention defined in claim 6, wherein said pipeline engaging and following means comprise a vertically adjustable dependent bracket and pipeline engaging roller means on each said fixed platform and said wing plates:
 said roller means beneath said fixed platform comprising an index roller adapted to first engage said pipeline and said roller means beneath said wing plates being adapted to engage and disengage said pipeline upon displacement of said wing plates by said power actuating cylinders;
 whereby, said engaging and following means is selectively adaptable to a variety of pipeline diameters.

10. The invention defined in claim 6, wherein said variable flow valve means selectively control the rates of rotation of said motor means and said cutter means by controlling the exhaust rate from said motor means and simultaneously effects a flow of compressed air through said pressure conduit means into said material conduit means at a flow rate proportional to the speed of said cutter means, thereby effecting material removal from said trench cut at a rate consistent with the speed of said cutter means;
 wherein said pipeline engaging and following means comprise a vertically adjustable dependent bracket and pipeline engaging roller means on each said fixed platform and said wing plates;
 said roller means beneath said fixed platform comprising an index roller adapted to first engage said pipeline and said roller means beneath said wing plates being adapted to engage and disengage said pipeline upon displacement of said wing plates by said power-actuating cylinders;
 whereby, said engaging and following means is selectively adaptable to a variety of pipeline diameters.

11. The invention defined in claim 10, wherein each said cutter means, during rotation, describes a frustoconical surface.

12. The invention defined in claim 6, wherein each said cutter means, during rotation, describes a frustoconical surface.

13. The invention defined in claim 6, wherein, in said ambulatory vehicle, each of said hull sections includes traction means engaging said submerged surface.

14. The invention defined in claim 6, wherein, in said ambulatory vehicle, each of said hull sections comprises elongated skid means.

15. The invention defined in claim 6, wherein, in said ambulatory vehicle, each of said hull sections comprises elongated skid means; and wherein said raised frame portion includes a substantially fixed central frame means mounting said fixed platform and an outrigger frame means for each said hull section, vertically pivoted to said fixed central frame means;

each said outrigger frame means comprising, in vertical section, a parallelogram linkage having selectively extensible diagonal link means controlling the vertical and horizontal displacement of said hull sections from said fixed central frame means.

16. The invention defined in claim 15, wherein said selectively extensible diagonal link means comprises at least one compressed air actuated cylinder means having an extensible actuating rod, said cylinder means effecting a compressible action permitting its associated hull section to displace independently of the other hull section in response to changes in the topography of said submerged surface.

17. Trenching apparatus adapted to be carried by a vehicle over a submerged pipeline for entrenching the latter beneath a submerged surface, said apparatus comprising:
 pipeline engaging and following means;
 rotary cutter means adapted to effect a trench cut beneath said pipeline;
 material removal means associated with said cutter means to evacuate material from said trench cut adjacent said cutter means;
 first power means juxtaposing said engaging and following means with said pipeline; and
 second power means, common to said cutter means and said material removal means effecting coordination of the speed of said cutter means with the rate of removal of material from said trench cut by said material removal means.

18. The invention defined in claim 17, wherein said engaging and following means are adjustable to a variety of pipeline diameters.

19. The invention defined in claim 17, wherein said material removal means comprises at least one substantially vertical airlift conduit having a material intake at its lower end adjacent the lowermost portion of said cutter means and a material exhaust at its upper end; and
 wherein said second power means comprises a pneumatic motor driving said cutter means and having a pressure input, a pressure output and a selectively variable flow rate exhaust valve at said pressure output;
 and a pneumatic conduit interconnecting said pressure output through said exhaust valve and into said vertical airlift conduit above and adjacent to said material intake;
 said exhaust valve varying the speed of said pneumatic motor means and said cutter means by controlling the exhaust rate from said pressure output and simultaneously varying the rate of pneumatic flow from said pressure output into said airlift conduit to effect a rate of material removal therethrough in direct proportion to the speed of said cutter means.

20. The invention defined in claim 17, wherein said cutter means and said material removal means are coordinated with said engaging and following means such that a trench cut is effected, beneath said pipeline, of a depth and width particularly adapted to the diametric size of said pipeline to effect a given trenching depth;
 wherein said material removal means comprises at least one substantially vertical airlift conduit having a material intake at its lower end adjacent the lowermost portion of said cutter means and a material exhaust at its upper end; and
 wherein said second power means comprises a pneumatic motor driving said cutter means and having a pressure input, a pressure output and a selectively variable flow rate exhaust valve at said pressure output;
 and a pneumatic conduit interconnecting said pressure output through said exhaust valve and into said vertical airlift conduit above and adjacent to said material intake;
 said exhaust valve varying the speed of said pneumatic motor means and said cutter means by controlling the exhaust rate from said pressure output and simultaneously varying the rate of pneumatic flow from said pressure output into said airlift conduit to effect a rate of material removal therethrough in direct proportion to the speed of said cutter means.

21. The invention defined in claim 20, wherein said engaging and following means are adjustable to a variety of pipeline diameters.